United States Patent [19]

Woog

[11] Patent Number: 5,084,168

[45] Date of Patent: Jan. 28, 1992

[54] SYSTEM FOR REMOVING SUBSTANCES FROM A SOLUTION

[76] Inventor: Manfred Woog, 1040 Pershing St., Craig, Colo. 81625

[21] Appl. No.: 645,897

[22] Filed: Jan. 25, 1991

Related U.S. Application Data

[63] Continuation-in-part of Ser. No. 451,323, Dec. 15, 1989, Pat. No. 4,988,448.

[51] Int. Cl.$^5$ .............................................. B01D 15/00
[52] U.S. Cl. .................................... 210/202; 210/266; 210/289
[58] Field of Search ............... 210/259, 265, 266, 287, 210/289, 493.4, 202; 266/170

[56] References Cited

U.S. PATENT DOCUMENTS

| | | | |
|---|---|---|---|
| 3,585,130 | 6/1971 | Gregory | 210/266 |
| 3,909,402 | 9/1975 | Gartner | 210/266 |
| 4,325,732 | 4/1982 | Woog | 75/109 |
| 4,608,177 | 8/1986 | Woog | 210/738 |
| 4,662,613 | 5/1987 | Woog | 266/170 |

Primary Examiner—Ivars Cintins
Attorney, Agent, or Firm—Arnold B. Silverman; Rita M. Rooney

[57] ABSTRACT

A filtering assembly is provided for removal of certain substances from a solution. More particularly, apparatus are provided for removal of hazardous or environmentally unacceptable chemicals from a first solution before it is discharged. The device includes a cylindrical housing having a spaced apart inlet and outlet. Adjacent the inlet, a metal precipitate chamber is provided to collect precipitates which includes rolled fiberglass for capturing precipitates. A filter subassembly is provided on the downstream side of the inlet. The solution is then directed through an adsorption chamber containing activated carbon. In this chamber, certain chemicals are absorbed onto the carbon. A second embodiment of the invention provides multiple inlets for chemicals being introduced into the chamber as well as a water inlet. The chemical inlets are provided with distribution manifolds to evenly disburse the incoming solution within the chamber. In this embodiment, the absorption chamber is located further up stream to allow back flow of the solution through the chamber after the precipatates have been removed. The device has particular application to the disposal of spent photochemicals such as developer solutions.

10 Claims, 3 Drawing Sheets

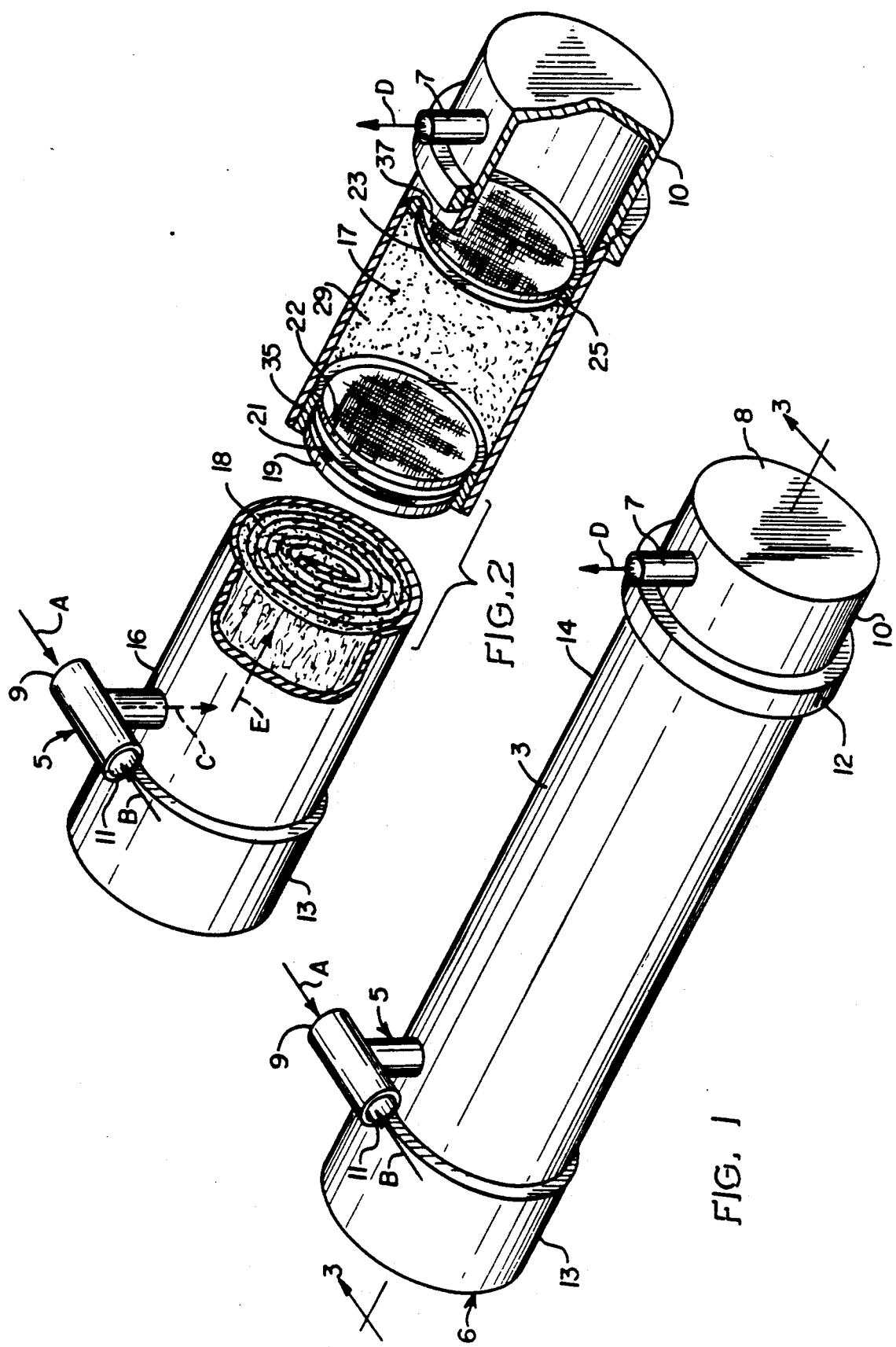

SYSTEM FOR REMOVING SUBSTANCES FROM A SOLUTION

CROSS REFERENCE TO RELATED APPLICATION

This Application is a continuation-in-part of U.S. application Ser. No. 07/451,323, filed Dec. 15, 1989, entitled METHOD FOR REMOVING SUBSTANCES FROM A SOLUTION, now U.S. Pat. No. 4,988,448.

BACKGROUND OF THE INVENTION

1. Field of the Invention

This invention relates to a system which may be used to remove from a solution certain substances and, in particular, it relates to removal of chemicals and compounds which are hazardous to the environment or to reclaim substances which are useful for some other purpose.

2. Description of the Prior Art

Environmental protection is of the utmost importance in today's society. Legislators have recognized the threats to the environment and have enacted protective legislation. Compliance with those increasingly stringent environmental protection regulations, however, is one of the greatest challenges facing industry today. Such compliance can become extremely costly to the point where competitive pricing can be jeopardized.

Many methods have been suggested to purify or at least make environmentally acceptable, industrial waste products. In the chemical industry, a particular problem relates to discharge of effluent into water supplies. The effluent must not contain certain substances beyond specific limits even though the water will later be treated in a treatment facility.

For example, certain legislation is directed toward retaining and preserving the biological oxygen demands in water supplies as well as the chemical oxygen demands in water supplies. It is required to minimize certain chemicals, such as ammonia, which are harmful to those qualities.

A variety of devices and methods have been known for purifying waste solutions. For example, it has been known to utilize reverse osmosis, ozonization, and resin ionic exchange.

In addition, it has been known to filter iron precipitates from photochemical solutions prior to discharge. A system for such a procedure is disclosed in U.S. Pat. No. 4,608,177, but it does not provide for removal of ammonia and similar substances.

Unfortunately, such prior art devices can be extremely complex and expensive. There remains a need for a simple, low cost device which can be readily employed to filter undesirable chemicals out of solutions on a smaller scale than the situations that previously known techniques have addressed.

It may also be desirable in other applications to filter out and reclaim useful substances which would otherwise be discarded and wasted. My U.S. Pat. No. 4,662,613 describes a reusable precious metal recovery cartridge which may be used, for example, to recover silver from certain photographic solutions. My U.S. Pat. No. 4,325,732 also discloses a precious metal recovery cartridge.

My prior patents, however, do not focus on removal of hazardous or environmentally unacceptable chemicals from the solution. There remains a need for an effective system which can remove unwanted substances from a solution and which can also be used to recover metals, and which devices may be used in connection with precious metal recovery cartridges, preferably, after the cartridges have been employed to recover the precious metals. As stated hereinbefore, there also remains a need for a simple, low cost device which is disposable and easy to use.

SUMMARY OF THE INVENTION

These and other needs have been satisfied by the device and method of the present invention which provides a system for the removal of certain chemicals from a waste solution. The system is particularly useful in treatment of spent photo-chemicals. Specifically, the invention involves the introduction of photochemical developer to fixer or to bleach and fixer combinations in order to precipitate out iron particles, as well as other chemical constituents. Thereafter, the solution is passed through a filtering system to remove any particles. Following the filtering stage, the solution passes through a chamber containing activated charcoal, and elements such as ammonia and other undesirable chemicals are removed. The solution then passes through a further filtering member, and any remaining solids are filtered out. At that point, the solution is free of the undesired substances and can be disposed of.

The device of the present invention includes a housing with an inlet in communication with a first chamber into which the waste solution is introduced. The solution may be mixed with at least one other solution which may be either acidic or basic in order for pH adjustment to cause precipitation of iron and other materials. Precipitates are then collected in a chamber containing a suitable filtering material such as rolled fiberglass. The precipitates may be recovered from the rolled fiberglass if they may be useful for some other purpose. Thereafter, the remaining solution is passed through a further filtering assembly and other residual solid particles are filtered out. The solution is then passed through an activated carbon adsorption chamber and, as mentioned hereinbefore, chemicals are absorbed from the solution into the activated carbon. If desired, a further filtering assembly may be provided. The solution is then discharged from the housing. Permanent or removable top caps are provided on the housing.

In accordance with another aspect of the invention, separate inlet conduits are provided for water and for certain other liquids to be treated and developed such as, for example, used photographic fixer and developer. The water inlet conduit has a first portion which communicates with an external pipe leading into the housing. It has a second portion which is disposed at an angle substantially ninety degrees from the first portion. The second portion includes a venturi throat to restrict the flow of water therethrough and to increase the velocity of the water through it. The chemical inlet conduits are provided with discharge manifolds at one end which assist in dispensing the fluids throughout the chamber. The manifolds additionally resist clogging in the inlet conduits. The alternative embodiment of the invention may also include a sub-chamber filled with a high surface area material such as fiberglass or plastics for collecting and trapping the precipitates which result from the mixing of the chemicals entering the device.

It is an object of the present invention to provide a system which efficiently removes various chemicals from a solution before the solution is discarded.

It is another object of the invention to provide a system which is capable of removing hazardous or environmentally unacceptable chemicals from a solution.

It is another object of the invention to provide a system which allows efficient recovery of certain metals which are precipitated out from the solution.

It is a further object of the invention to provide a device which is economical and easy to use.

It is a further object of the invention to provide a method of filtering solutions to remove certain substances.

It is a further object of the present invention to provide a system which allows removal of both useful substances and harmful substances from spent photochemical solutions.

These and other objects of the invention will be more fully understood from the following description of the invention with reference to the illustrations appended hereto.

BRIEF DESCRIPTION OF THE DRAWINGS

FIG. 1 is a perspective view of one embodiment of the system of the present invention.

FIG. 2 is an isometric view partially in section of the system of the present invention with a center portion broken away in order to show the adsorption chamber.

DESCRIPTION OF THE PREFERRED EMBODIMENTS

Figure 3:
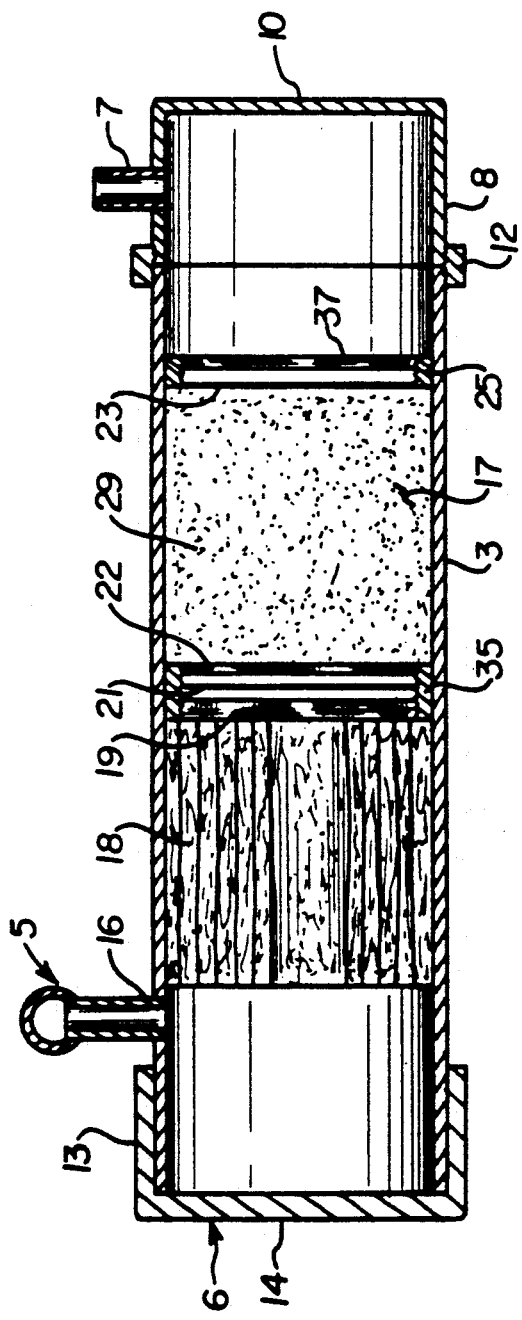
FIG. 3 is a cross-sectional view taken along line 3—3 of FIG. 1.

Referring more specifically to FIGS. 1 through 4, one of the preferred embodiments of the present invention is shown. For simplicity of disclosure, hereinafter a system for the removal of hazardous or ecologically unacceptable materials from photochemical solutions will be explained, however, it is to be understood that the present invention is not limited to the removal only of hazardous substances from photochemical solutions. The device can be used with other types of solutions while remaining within the scope of the present invention.

FIG. 1 shows the removal system having a generally cylindrical, hollow housing 3 which may be composed of stainless steel, polyvinyl chloride, acrylonitrile butadiene styrene, polypropyline, fiberglass, acrylic or other polyplastics, for example, and is preferably made of polyvinyl chloride or fiberglass. The cylindrical housing 3 has a dual inlet 5 and tubular outlet 7. The dual inlet 5 allows for a first solution to be introduced into the first tubular opening 9 and a second solution into the second tubular opening 11 of inlet 5.

Housing 3 is closed at the respective ends. The inlet end 6 of housing 3 may have a removable cap 13 thereon which can be unscrewed in order to gain access to precipitates that have collected therein. Outlet end 8 of housing 3 may also either be closed, except for tubular outlet 7 which is open, or it may be provided with a continuous removable cap which can be unscrewed and removed providing greater access to the interior of housing 3, if desired.

The cap 10 in the form shown is held in engaging relationship with housing 3 by annular sealing gasket member 12. The inside surface (not shown) of gasket 12 may be tapered so that the leading edge of the gasket 12 can receive end portion 14 of housing 3 and seal the engaging interface between the cap 10 and housing 3 to resist leakage of the liquid being treated. For convenience of disclosure, there is shown an annular ring gasket sealing member 12 against the housing exterior, but it is to be understood that any other suitable cap sealing means may be employed.

Referring now to FIGS. 2 and 3, the interior of the cylindrical housing 3 of the system of the present invention is shown. Inlet 5 has dual openings, i.e., first tubular opening 9 and second tubular opening 11 (FIG. 2). A waste solution, such as a spent developer which was used in photographic processing, would be introduced into tubular opening 9 in the direction A. A second solution is introduced into opening 11 in the direction B which will appropriately adjust the pH of the mixture of both solutions so as to cause the precipitation of metals from the developer introduced through opening 9. The second solution may preferably be either sodium bisulfate or sodium hydroxide or, in certain cases, an acidic substance depending upon the application as would be understood by one skilled in the art in order to effect the required pH adjustment to cause precipitation. If the desired precipitate is iron, for example, sodium bisulfate would be used as the second solution which is introduced into tubular opening 11. The solutions are introduced by hose connections (not shown) and are introduced at sufficient force to cause intimate admixing of the solutions, and this force would be readily understood by one skilled in the art.

Inlet 5 also has an opening 16 through which the first solution and second solution, having been mixed, flow in the direction C. Precipitation begins to occur in tubular inlet 5 around the area near opening 16 and as the solution flows out through opening C. In order to resist precipitates from flowing backwards in the direction opposite C, a filter material such as rolled fiberglass 18 may be provided as shown in FIGS. 2 and 3. Precipitates will be captured by rolled fiberglass 18. The fiberglass 18 can then be removed and the precipitates recovered from the fiberglass if desired.

Figure 4:
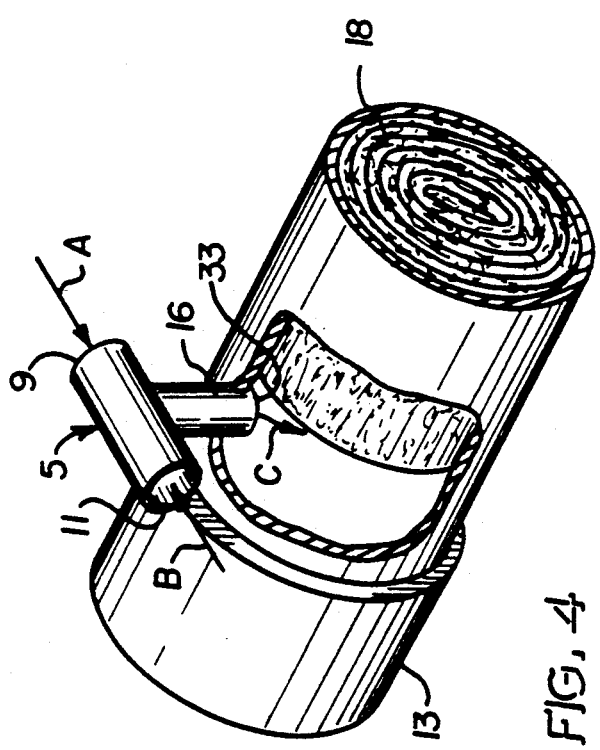
FIG. 4 is a partial, cross-sectional view of the device of FIG. 1 with a portion broken away to show the inlet of the present invention.

Adjacent the rolled fiberglass 18 is placed a first fiberglass filter 19 (FIGS. 2 and 4). Fiberglass filter 19 serves to capture smaller particles such as iron precipitates and other precipitated compounds which may not have been trapped by surrounding fiberglass 18.

First polyester batten filter 21 is placed adjacent to the first fiberglass filter 19 to further filter out any remaining particles which were too fine to be stopped by fiberglass filter 19.

Grate 22 has cylindrical support and a screen-like body portion. It has the function of structural support to hold the various items in position and to resist undesired deterioration of the adjacent filters. Grate 22 and filters 19 and 21 are held in place by hollow plastic spacer ring 35.

It should be understood that a different arrangement and numbers of grates and filters could be used while remaining within the context of the present invention. And further, it should be understood that the materials used for the various filters may be changed and different materials may be substituted therefore while Q remaining within the context of the present invention.

The system also contains within housing 3 activated carbon chamber 17. Activated carbon chamber 17 is shown in FIGS. 2 and 3. The chamber 17 contains carbon which has previously undergone the process of being acid washed and pelletized in order to remove iron from the naturally occurring carbon. The activated carbon may be in the form of loose pieces contained within chamber 17, or the pieces may be contained within a porous bag. Alternatively, the carbon may be affixed to another medium such as is shown in my prior U.S. Pat. Nos. 4,662,613 and 4,325,732 wherein I show a spiral configuration of a an ion exchange mass in connection with a precious metal recovery cartridge.

The pieces of the carbon in chamber 17 could be between about 0.06 inches and 0.02 inches in diameter and would preferably be 0.03 inches in diameter. Certain chemical constituents in the solution will adsorb onto the activated carbon of chamber 17 when the solution passes through chamber 17. Such chemicals may be, for example, ammonia, hydroquinone and other organic compounds. These are the chemicals which are either hazardous to health or to the environment and which should be removed or minimized prior to discharge of the solution into the environment.

A second polyester batten filter 23 may be placed adjacent the activated carbon chamber 17 toward the outlet end 8 of the cylindrical housing 3. This serves to retain any loose carbon pieces within the system. The housing 3 may also contain an additional grate 37 for support. A round plastic support element 25 may also be placed within housing 3 as shown in FIG. 3 to retain the various elements in a stationary position.

As noted hereinbefore, a permanent cap or ring gasketed removable cap 10 (FIG. 1) may be placed at outlet end 8. Alternatively, a screw-on cap may be provided.

After the solution has passed through the activated carbon chamber 17, the undesired chemicals having been removed, it is discharged through outlet 7.

Referring now to FIG. 4, a more detailed view of inlet 5 and the interior of housing 3 are shown. Inlet 5 has tube 16 which has opening 33 leading into the housing 3.

As discussed hereinbefore, a spent developer solution is introduced into inlet opening 9 and flows in the direction A. A second solution such as fixer, as well as an additive providing suitable additional pH adjustment, if necessary in the application, are introduced by way of inlet opening 11 in the direction B. These solutions are mixed by their joint passage through opening 33 in inlet 5. As discussed hereinafter, the mixed chemicals then are allowed to react with each other through the appropriate dwell time according to demand and physical size of the housing 3.

In operation, tubular opening 9 would be connected to a hose connector leading from a source of spent developer to be disposed of, and the developer is thereby introduced into tubular opening 9 of inlet 5. Spent developer is usually highly alkaline, with a pH concentration of approximately 11 to 13. Tubular opening 11 has connected to it a hose connector leading from a source of photographic fixer which preferably already has undergone a desilvering process such as is described in my prior U.S. Pat. Nos. 4,662,613 and 4,325,732 discussed hereinbefore. The desilvered fixer is generally acidic with a pH of between about 4 to 5.

When the developer and fixer enter inlet 5 by way of tubular openings 9 and 11, respectively, they flow through tube 16 and opening 33 where they are mixed as they flow through causing some of the iron in the fixer to precipitate. The partially mixed liquids flow out of opening 33 into the housing 3. The developer and mixer further are allowed to react for a dwell time of between about 5 minutes and 15 minutes, and preferably for about 10 minutes. The solutions are thereby neutralized and iron plus other compounds are precipitated out of the mixture. As noted hereinbefore, the precipitates are trapped by rolled fiberglass 18. Fiberglass 18 may thereafter be removed and the precipitates recovered therefrom by any suitable means.

In many applications, it may be necessary to provide additional pH adjustment to cause the solutions to be neutralized. In such a case, a suitable alkaline or acidic additive, as would be known to those skilled in the art, may beaded to the fixer and, after being mixed with the fixer, the resulting solution can then be introduced into the system through tubular opening 11.

The flow rate of the mixture in the direction C must be sufficiently slow to allow the developer and fixer to react. In addition, the flow through activated carbon chamber 17 must be long enough to allow adequate adsorption. As would be readily understood by those skilled in the art, a longer period of contact between the solution and the activated carbon, would lead to a greater amount of chemicals being loaded onto the carbon. An appropriate flow rate would be between 100 and 300 cc per minute per cubic foot of carbon, and would preferably be 200 cc per minute per cubic foot of carbon. This would, however, depend upon the size of the housing to be used in the application.

The solution may be pumped in the direction E (FIG. 2). Alternatively, the solution may be drawn back in the direction E by gravitational forces depending upon the orientation of the device in the particular application. It would be understood by those skilled in the art how to achieve the desired flow rate.

Figure 5:
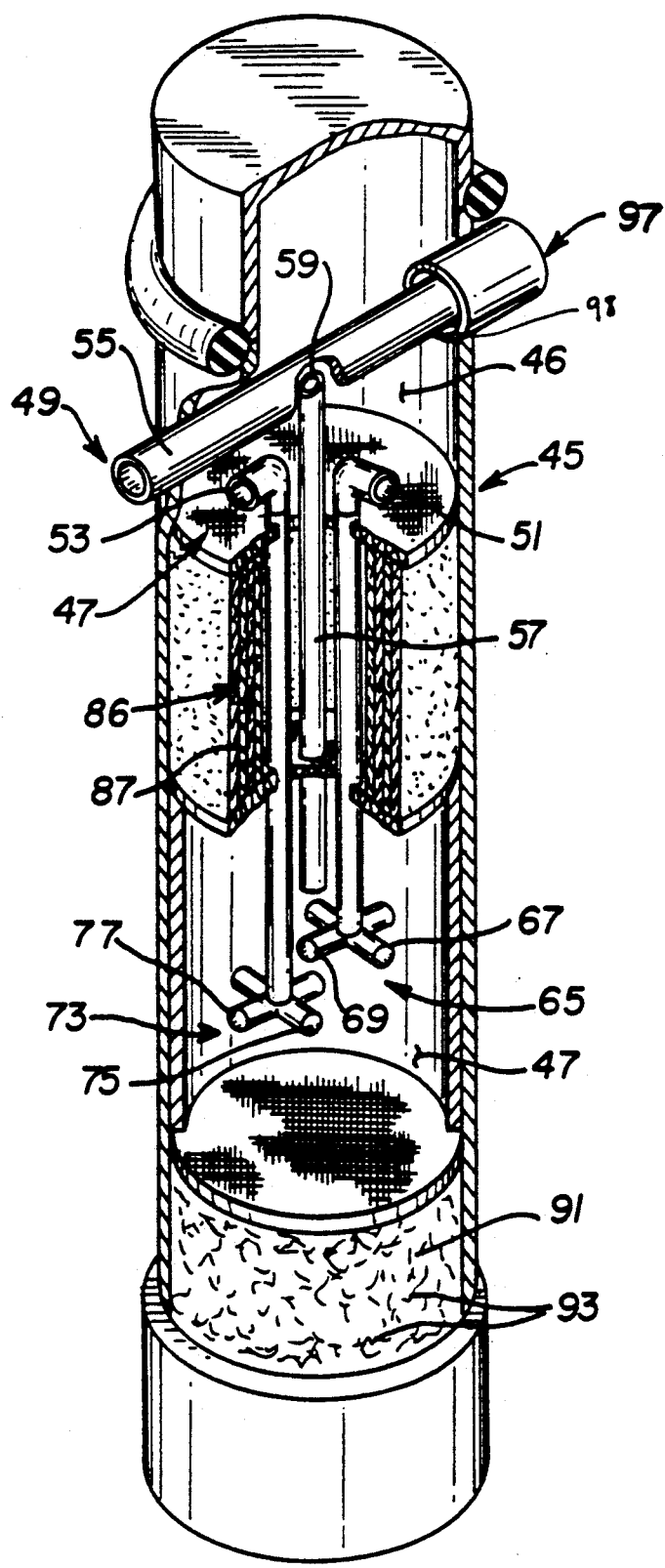
FIG. 5 is a schematic isometric drawing of another embodiment of the invention with portions of the drawing cut away to expose interior features.

Precipitated particles which may have escaped fiberglass 18 may be filtered out by grate 22, depending upon the mesh size chosen for the grate 22. In addition, fiberglass filter 19 and polyester filter 21 filter out even finer residual particles. The solution is thereafter passed through activated carbon chamber 17. Chemicals, such as ammonia, are absorbed onto the activated carbon. In this way, harmful chemicals are removed and the solution is made environmentally acceptable and it is ready to be discharged to a sewer system. In addition, iron and, in other applications, other metals can be recovered from the housing In accordance with another aspect of the invention, additional piping and manifolds may be added to assist in the distribution of the liquids throughout the housing. As shown in FIG. 5, housing 45 may be constructed of the same materials disclosed hereinbefore with respect to the embodiment of FIG. 1. Housing 45 encloses first interior chamber 46 and second interior chamber 47. Housing 45 has multiple inlets More specifically, housing 45 first has water inlet conduit 49. In the application involving removal of certain substances from used photographic chemicals, a developer inlet conduit 51 and a fixer inlet conduit 53 are also included.

Water inlet conduit 49 has a first pipe section 55 and a second pipe section 57 disposed at an angle of about ninety degrees to first pipe section 55. Second pipe section 57 has a venturi-shaped opening 59 leading from first pipe section 55 to second pipe section 57. The venturi opening 59 regulates the amount of water entering the system. It meters the water to a precise flow rate, the rate of flow through the venturi opening is preferably about 1 percent of the overall flow rate of water into water inlet conduit 49. The water is conveyed into second interior chamber 47 in order to replenish the oxygen in second chamber 47 and to provide a positive overall pressure on the liquid in housing 45. Preferably, only a relatively small flow of water is allowed to enter the chamber through the venturi opening 59. For example, the flow rate may be about 200 cc per minute.

In accordance with this aspect of the invention, developer inlet conduit 51 and fixer inlet conduit 53 are provided with distribution manifolds. Specifically, developer inlet conduit 51 has distribution manifold 65 at one end thereof which preferably has four openings such as openings 67 and 69, and two other openings opposed to openings 67 and 69 which are not visible in FIG. 5. The developer liquid which enters the interior chamber 47 through inlet 57 flows radially outwardly from manifold 65 and is distributed evenly into chamber 47. Similarly, fixer inlet 53 has distribution manifold 73 which preferably has four openings consisting of openings 75 and 77, and two additional openings not visible in FIG. 5.

In the embodiment shown in FIG. 5, it is preferred that the developer manifold 65 is at a higher level in the chamber 46 than is fixer manifold 73. In other words, the fixer manifold 73 extends further into chamber 47 than does developer manifold 68 thereby showering the alkaline developer solution over the lower pH solution. Other configurations for the manifolds could be provided while configurations for the manifolds could be provided while remaining within the scope of the present invention.

In accordance with this aspect of the invention, manifolds 65 and 73 lead into the second interior chamber 47 which is preferably an open space. This allows a greater amount of mixture to occur between the two solutions and allows a greater efficiency of reaction. When the liquids so introduced come in contact with one another, a chemical reaction as described hereinbefore takes place and precipitation occurs. Primarily, iron particles are precipitated out, however, in other applications other substances, such as silver, for example, may be the precipitates. The precipitated particles settle into lower sub-chamber 91. Sub-chamber 91 contains loose flakes of material 93 such as fiberglass or plastics. This material 93 should be a thin material but which provides a high surface area in order to trap the fine precipitates for later collection.

The embodiment of FIG. 5 also contains absorption chamber 86 which is preferably composed of fiberglass coated with carbon particles. The fiberglass is rolled into a spiral absorption member 87. Alternatively, loose pieces of carbon such as pieces 17 of FIG. 3 may be used for the absorption chamber 86 in the same manner as described with reference to the embodiment of FIG. 1. The carbon pieces may alternatively be encapsulated in a plastic resin compound which may be in beaded form or otherwise, such as are used in ion exchange resin applications.

Chemical reactions which occur when the device of FIG. 5 is used with used photographic chemicals are the same as described hereinbefore with respect to the first embodiment. However, it is preferred in the embodiment of FIG. 5 to provide outlet 97 which is at the same level in the chamber as the water area 49. This is for convenience due to the high volume contained within the chamber. However, other configuration may be used while remaining within the context of the present invention. The treated fluid may be pumped out of outlet 97, or can be drawn out through gravitational forces if a positive pressure is applied at water inlet conduit 49 and developer and fixer inlet conduits 51 and 53 and if the total volume of liquid in the housing remains adequate. For example, the water may flow into the chamber at 10 liters per minute, the developer would flow into the chamber at 250 cubic centimeters per minute and the fixer may enter the chamber at 250 cubic centimeters per minute. The fluid exits outlet 97 through the annular opening 98 between outlet 97 and inlet pipe 49.

It should be understood that this embodiment of the invention provides a device for removing hazardous chemicals from a solution and for collecting useful materials from a solution which has the benefits of being low cost, reliable and efficient.

It should be understood that the devices have application beyond the photochemical application which was discussed herein as an exemplary embodiment. It will be appreciated that the invention provides apparatus for the removal of certain undesired materials in an efficient and economical manner.

Whereas particular embodiments of the invention have been described hereinbefore for purposes of illustration, it will be appreciated by those skilled in the art that numerous variations of the details may be made without departing from the invention as described in the appended claims.

What is claimed is:

1. A treatment assembly for the removal of chemicals and precipitates from solutions, comprising:
   a generally cylindrical housing having a first interior chamber and an axially displaced second interior chamber for receiving at least a first solution,
   inlet means in communication with said second interior chamber for introducing a first solution into said second interior chamber, said inlet means having distribution manifold means disposed generally at one end thereof through which said first solution is discharged into said chamber,
   water inlet means also in communication with said second interior chamber for introducing water into said second interior chamber at a predetermined flow rate, said water inlet means having a venturi-shaped throat means disposed along said inlet means for restricting said flow rate of water through said water inlet means,
   absorption means containing activated carbon disposed within said first interior chamber for receiving said solution from said second chamber and causing absorption of chemicals from said solution onto said carbon,
   outlet means disposed in said housing to allow discharge of said solution after it has passed through said absorption means, and
   filtering means disposed within said housing for filtering out precipitates.

2. The treatment assembly of claim 1 wherein
   said inlet means is composed of a first inlet for introducing one solution into said second interior chamber and second inlet disposed generally adjacent said first inlet, said second inlet being for introducing another solution into said second chamber.

3. The treatment assembly of claim 2 wherein said first and second inlets each have an associated distribution manifold means disposed generally at one end thereof, and each associated distribution manifold means has a plurality of outlet openings such that solution flows therefrom radially outwardly into said second interior chamber.

4. The treatment assembly of claim 2 wherein said housing also has a third interior chamber disposed therein into which said precipitates are collected, said third interior chamber being disposed generally at one end of said housing generally adjacent said second interior chamber.

5. The treatment assembly of claim 4 wherein said third interior chamber contains a plurality of pieces of a material for trapping said precipitates in said material.

6. The treatment assembly of claim 4 wherein said first and second chambers are separated by a spacer disk having mesh-like openings.

7. The treatment assembly of claim 4 wherein said second and third interior chambers are separated by a spacer disk having mesh-like openings.

8. The treatment assembly of claim 1 wherein said absorption means and said filter means are composed of activated carbon disposed on fiberglass and rolled in a spiral configuration.

9. The treatment assembly of claim 8 wherein said absorption means and said filter means in said spiral configuration are disposed in said first interior chamber.

10. The treatment assembly of claim 1 wherein said absorption means is composed of pieces activiated carbon encapsulated in a plastic resin compound.

* * * * *